(12) United States Patent
Wu et al.

(10) Patent No.: US 12,515,549 B2
(45) Date of Patent: Jan. 6, 2026

(54) AUTOMOBILE CHARGER, CHARGING METHOD AND MEDIUM

(71) Applicant: Zhejiang Safemate Automotive Safety & Emergency Technology Co., Ltd., Hangzhou (CN)

(72) Inventors: Zhonghua Wu, Hangzhou (CN); Naixing Wang, Hangzhou (CN)

(73) Assignee: Zhejiang Safemate Automotive Safety & Emergency Technology Co., Ltd., Hangzhou (CN)

( * ) Notice: Subject to any disclaimer, the term of this patent is extended or adjusted under 35 U.S.C. 154(b) by 741 days.

(21) Appl. No.: 17/821,324

(22) Filed: Aug. 22, 2022

(65) Prior Publication Data
US 2024/0017634 A1    Jan. 18, 2024

(30) Foreign Application Priority Data

Jul. 12, 2022  (CN) .......................... 202210818400.8
Jul. 13, 2022  (CN) .......................... 202210825590.6

(51) Int. Cl.
*B60L 53/62*     (2019.01)
*B60L 53/30*     (2019.01)
(Continued)

(52) U.S. Cl.
CPC ............. *B60L 53/62* (2019.02); *B60L 53/305* (2019.02); *B60L 58/12* (2019.02);
(Continued)

(58) Field of Classification Search
CPC ..... H01M 10/44; H01M 10/443; B60L 58/10; B60L 58/30; B60L 53/62; B60L 53/305;
(Continued)

(56) References Cited

U.S. PATENT DOCUMENTS

2009/0160407 A1*   6/2009   Hwang ..................... H02J 7/04
                                                         320/157
2016/0322834 A1*  11/2016   Carpenter, Jr. ..... H02J 7/00712
(Continued)

*Primary Examiner* — Julian D Huffman
*Assistant Examiner* — Nathan J Instone
(74) *Attorney, Agent, or Firm* — Schwegman Lundberg & Woessner, P.A.

(57) ABSTRACT

An automobile charger, a charging method and a medium are provided. The charger includes a MCU, a switching power supply circuit, a first and second charging circuits, a battery voltage detection circuit, a charging current detection circuit, a constant-current driving control circuit, a constant-voltage driving control circuit and a switch driving control circuit. The charger is provided with the first and second charging circuits, which can realize three charging modes on the battery. The real-time voltage signal and the real-time current signal are collected with the battery voltage detection circuit and the charging current detection circuit, and through feedback of the real-time voltage signal and the real-time current signal, the MCU is configured to output PWM signals with different duty ratios to the constant-current driving control circuit and the constant-voltage driving control circuit, so as to realize output of different voltage values and current values of the switching power supply.

16 Claims, 8 Drawing Sheets

(51) Int. Cl.
    *B60L 58/12*      (2019.01)
    *H02J 7/00*       (2006.01)
    *H02J 7/04*       (2006.01)

(52) U.S. Cl.
    CPC ...... *H02J 7/00304* (2020.01); *H02J 7/00309* (2020.01); *H02J 7/0048* (2020.01); *H02J 7/0069* (2020.01); *H02J 7/04* (2013.01); *B60L 2240/545* (2013.01); *B60L 2240/547* (2013.01); *H02J 7/00711* (2020.01); *H02J 7/00714* (2020.01); *H02J 7/007182* (2020.01)

(58) Field of Classification Search
    CPC ............... B60L 58/12; B60L 2240/545; B60L 2240/547; B60L 53/11; B60L 53/20; B60L 53/22
    USPC .......................................... 320/109, 139–146
    See application file for complete search history.

(56) References Cited

U.S. PATENT DOCUMENTS

| | | | | |
|---|---|---|---|---|
| 2018/0367047 A1* | 12/2018 | Zhang | ............... | H02M 3/33523 |
| 2023/0114055 A1* | 4/2023 | Peeck | ................... | H02M 1/32 |
| | | | | 323/271 |

* cited by examiner

AUTOMOBILE CHARGER, CHARGING METHOD AND MEDIUM

CROSS REFERENCE TO RELATED APPLICATION

This Non-provisional application claims priority under 35 U.S.C. § 119(a) to Chinese Patent Application No. 202210818400.8, filed on 12 Jul. 2022, and to Chinese Patent Application No. 202210825590.6, filed on 13 Jul. 2022, the entire contents of which are hereby incorporated by reference in its entirety.

TECHNICAL FIELD

The disclosure relates to a technical field of automobile emergency charging, in particular to an automobile charger, a charging method and a medium.

BACKGROUND ART

With gradual improvement of people's living standards, vehicles have become a main means of transportation. A battery is an important tool for engine ignition. When the battery is insufficient, it needs to be charged. Once the battery is with an insufficient voltage, the automobile cannot be started, thus affecting normal use of the automobile.

At present, existing automobile battery chargers have following defects: 1. High failure rate, poor safety performance, and no intelligent analysis and determination during use of the automobile charger, which even affects service life of the automobile battery. 2. an unreasonable charging mode, which results in low charging efficiency of the automobile battery and affects use of automobile owners.

SUMMARY

To solve the above problems, the technical scheme provided in the disclosure is as follows.

An automobile charger is provided, which includes a microcontroller unit (MCU), a switching power supply circuit, a first charging circuit, a second charging circuit, a battery voltage detection circuit, a charging current detection circuit, a constant-current driving control circuit, a constant-voltage driving control circuit and a switch driving control circuit.

The MCU is configured to control a switching power supply circuit to output different charging modes according to a state of a battery to be charged.

The switching power supply circuit is configured for converting an alternating current into a direct current.

The first charging circuit is configured for providing constant-current or constant-voltage charging to the battery to be charged. The first charging circuit is connected between the switching power supply circuit and the battery to be charged, and an input of the first charging circuit is connected with an output of the MCU.

The second charging circuit is configured for providing pulse charging to the battery to be charged, the second charging circuit is connected between the switching power supply circuit and the battery to be charged, and an input of the second charging circuit is connected with the output of the MCU.

The battery voltage detection circuit is configured for detecting a real-time voltage signal of the battery to be charged and feeding the real-time voltage signal back to the MCU.

The charging current detection circuit is configured for detecting a real-time current signal of the battery to be charged and feeding a real-time current signal back to the MCU.

The constant-current driving control circuit receives the constant-current control signal of the MCU and adjusts a constant-current charging output of the switching power supply circuit.

The constant-voltage driving control circuit receives the constant-voltage control signal of the MCU and adjusts a constant-voltage charging output of the switching power supply circuit.

The switch driving control circuit receives the switch control signal of the MCU to control on and off of the switching power supply circuit.

In a further embodiment, the automobile charger includes a key circuit, a display circuit and a overtemperature detection circuit. The key circuit is connected with an input of the MCU and configured for adjusting or switching a type, a charging current and a charging voltage of the battery to be charged.

The display circuit receives a display control signal of the MCU and displays a current charging state.

The overtemperature detection circuit is configured for detecting a temperature signal of the battery to be charged and feeding the temperature signal back to the MCU.

In a further embodiment, the switching power supply circuit includes an overcurrent protection circuit, a surge protection circuit, a rectification circuit, a transformer circuit, a DC output circuit, a switching power supply chip and a step-down voltage circuit. The overcurrent protection circuit is connected with an external alternating current, the surge protection circuit is connected between the overcurrent protection circuit and the rectification circuit, and an output of the rectification circuit is respectively connected with the transformer circuit and the step-down voltage circuit; an output of the switching power supply chip is connected with the transformer circuit, and an input of the switching power supply chip are connected with the constant-current driving control circuit, the constant-voltage driving control circuit and the switch driving control circuit respectively. The transformer circuit is connected with the DC output circuit, and the DC output circuit is connected with the first charging circuit and the second charging circuit respectively.

In a further embodiment, the battery voltage detection circuit includes a resistor R64, a resistor R68, a resistor R70, a resistor R71, a resistor R72, a resistor R75, a diode D15, a capacitor C25 and an operational amplifier U2C. The resistor R68 and the resistor R64 are connected in series, one end of the resistor R68 is connected to the battery to be charged, and one end of the resistor R64 is grounded. The capacitor C25 and the diode D15 are both connected in parallel across two ends of the resistor R64, one end of the resistor R70 is connected with the other end of the resistor R64, the other end of the resistor R70 is connected with one end of the resistor R71 and a non-inverting input of the operational amplifier U2C, and the other end of the resistor R71 is connected with a high level, one end of the resistor R75 and one end of the resistor R72 are respectively connected to an inverting input of the operational amplifier U2C, the other end of the resistor R75 is connected with a high level, the other end of the resistor R72 is grounded, an output of the operational amplifier U2C is reversely connected with the first charging circuit, and one end of the capacitor C25 is configured to output a voltage sampling signal VS to the input of the MCU.

In a further embodiment, the charging current detection circuit includes a resistor R38, a resistor R44, a resistor R50, a resistor R58, a resistor R59, a resistor R61, a resistor R62, a resistor R84, a capacitor C24, a capacitor C30, a capacitor C31 and an operational amplifier U2B. The resistor R61 and the resistor R84 are connected in parallel, and one end of the resistor R61 is connected with the battery to be charged. The other end of resistor R61 is connected to one end of resistor R59, one end of resistor R59 is connected to one end of capacitor C31, one end of resistor R62 and a non-inverting input of operational amplifier U2B, the other end of capacitor C31 is grounded, the other end of resistor R62 is connected to a high level, one end of resistor R44 is connected to the inverting input of operational amplifier U2B and one end of resistor R38, the other end of the resistor R38 is grounded, the other end of the resistor R44 is connected with an output of the operational amplifier U2B, one end of the resistor R50 and one end of the resistor R58, the other end of the resistor R50 is grounded, the capacitor C24 is connected in parallel across two ends of the resistor R44, the other end of the resistor R58 is connected with one end of the capacitor C30, the other end of the capacitor C30 is grounded, and the other end of the resistor R58 is configured to output a current sampling signal IS to the input of the MCU.

In a further embodiment, the constant-current control signal and the constant-voltage control signal are both pulse signals, and the first charging circuit is a charging circuit with an open or closed contactor. The second charging circuit is a charging circuit with a turned-on/off power transistor.

A charging method using the automobile charger described above is provided, which includes following steps.

The automobile charger is connected between an external AC power supply and a battery to be charged, a battery type, a charging voltage and a charging current is set according to the battery to be charged so as to start charging.

A real-time voltage signal and a real-time current signal of the battery to be charged is collected, and the switching power supply circuit is controlled to perform different charging modes according to the real-time voltage signal and the real-time current signal of the battery to be charged. The charging modes include at least two of pulse charging, constant current charging, 0.5 times constant current charging, constant voltage charging, repair charging and float charging.

In a further embodiment, the real-time voltage signal and the real-time current signal of the battery to be charged are collected when the battery type of the battery to be charged is a lead-acid battery.

If the real-time voltage signal is less than a first voltage threshold, the second charging circuit is controlled to operate, and a first constant-current control signal is output to the constant-current driving control circuit and a first constant-voltage control signal is output to the constant-voltage driving control circuit at the same time, and the second charging circuit is configured to output a pulse signal to perform pulse charging on the battery to be charged.

If the real-time voltage signal is larger than the first voltage threshold and smaller than a second voltage threshold, the first charging circuit is controlled to operate, and a second constant-current control signal is output to the constant-current driving control circuit and a second constant-voltage control signal is output to the constant-voltage driving control circuit, so that the first charging circuit performs 0.5 times constant current charging on the battery to be charged.

If the real-time voltage signal is larger than the second voltage threshold and smaller than a third voltage threshold, the first charging circuit is controlled to operate, and a third constant-current control signal is output to the constant-current driving control circuit and a third constant-voltage control signal is output to the constant-voltage driving control circuit, so that the first charging circuit performs constant current charging on the battery to be charged.

If the real-time voltage signal is greater than the third voltage threshold, the first charging circuit is controlled to operate, and a fourth constant-current control signal is output to the constant-current driving control circuit and the fourth constant-voltage control signal is output to the constant-voltage driving control circuit, so that the first charging circuit performs constant voltage charging on the battery to be charged until the real-time current signal is less than the first current threshold, so as to complete the constant-voltage charging.

After the constant voltage charging is completed, the first charging circuit and the second charging circuit are disconnected to allow the charged battery to stand for a fixed time t, and then the real-time voltage signal is re-acquired, and a voltage drop value of the battery after standing for the fixed time t is calculated. If the voltage drop value exceeds a preset voltage drop value, the battery is determined to be damaged; then the first charging circuit is controlled to operate, and a fifth constant-current control signal is output to the constant-voltage driving control circuit and a fifth constant-voltage control signal is output to the constant-voltage driving control circuit at the same time, so that an output voltage of the switching power supply circuit is increased and repair charging is performed on the battery. If the voltage drop value does not exceed the voltage drop preset value, it is determined that the battery is normal, and float charging is performed on the battery until battery charging is completed.

In a further embodiment, the real-time voltage signal and the real-time current signal of the battery to be charged are collected when the battery type of the battery to be charged is a lithium battery.

If the real-time voltage signal is less than a fourth voltage threshold, the first charging circuit is controlled to operate, and a sixth constant-current control signal is output to the constant-current driving control circuit and a sixth constant-voltage control signal is output to the constant-voltage driving control circuit at the same time, so that the first charging circuit performs constant current charging on the battery to be charged.

If the real-time voltage signal is greater than the forth voltage threshold, the first charging circuit is controlled to operate, and a seventh constant-current control signal is output to the constant-current driving control circuit and the seventh constant-voltage control signal is output to the constant-voltage driving control circuit, so that the first charging circuit performs constant voltage charging on the battery to be charged until the real-time current signal is less than the second current threshold, so as to complete the battery charging.

A computer storage medium is provided, on which computer program instructions are stored. The computer program instructions, when executed by a processor, implement the charging method described above.

Compared with the prior art, the technical schemes provided in the disclosure have the following beneficial effects:

The automobile charger according to the present disclosure is provided with the first charging circuit and the second charging circuit, which can realize three charging modes on the battery, namely, the constant current charging, the constant voltage charging and the pulse charging. In a charging process, the real-time voltage signal and the real-time current signal are collected with the battery voltage detection circuit and the charging current detection circuit, and through feedback of the real-time voltage signal and the real-time current signal, the MCU is configured to output PWM signals with different duty ratios to the constant-current driving control circuit and the constant-voltage driving control circuit, so as to realize output of different voltage values and current values of the switching power supply, thereby performing different charging modes on the battery to be charged and improving charging efficiency and safety of the battery.

In the charging method according to the present disclosure, the real-time voltage signals and the real-time current signal are collected in the charging process, the lead-acid battery or lithium battery is charged by segments, the charging modes can be reasonably switched, the charging efficiency of the battery can be improved, and meanwhile performance of the battery can be analyzed in the charging process, so as to repair the battery.

DETAILED DESCRIPTION

Figure 1:
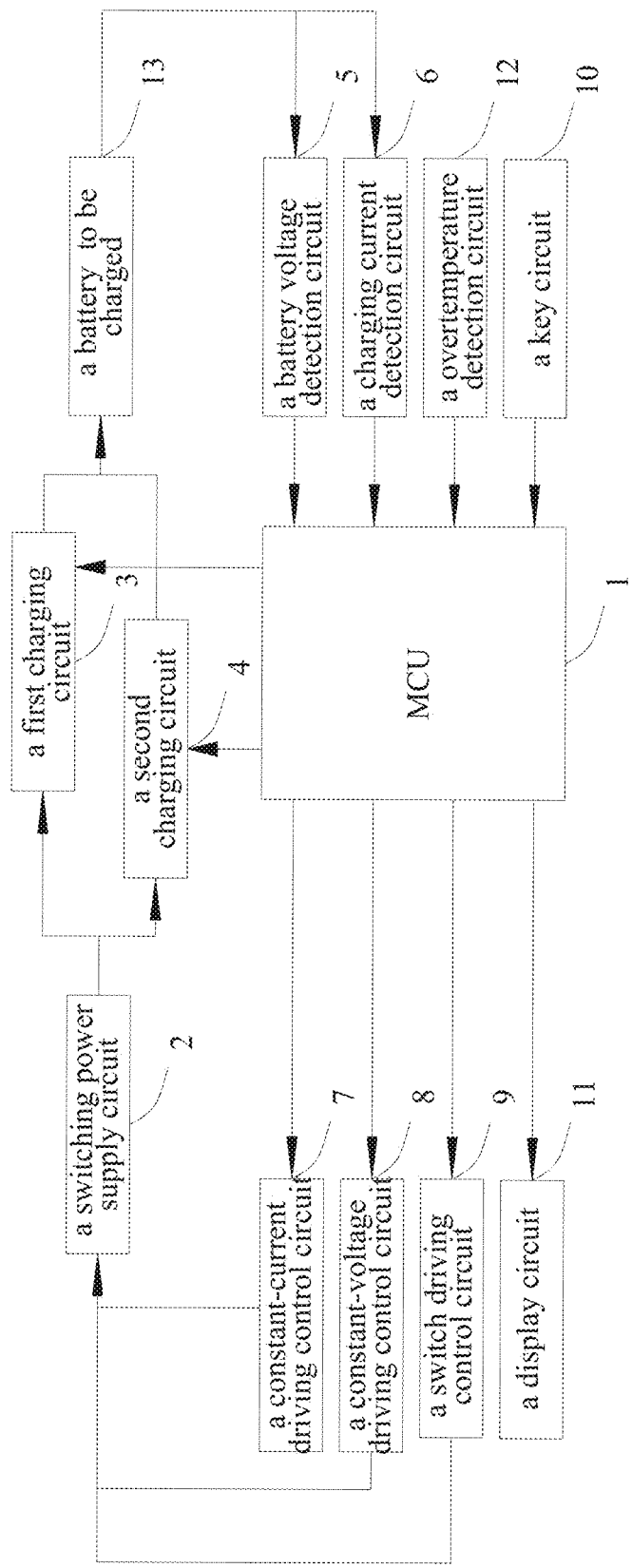
FIG. 1 is a circuit block diagram of an automobile charger according to an embodiment of the present disclosure.

In order to further understand contents of the present disclosure, the present disclosure will be described in detail with reference to drawings and examples.

It should be noted that the embodiments in the present disclosure and the characteristics in the embodiments can be combined mutually in the case of no conflict.

In description of this disclosure, it should be noted that unless otherwise specified and limited, terms "installing", "coupling" and "connecting" should be understood broadly, for example, it can be "fixedly connecting", "integrally connecting", or "detachably connecting"; or it can be "mechanically connecting" or "electrically connecting", or it can be "communicating within two elements"; or it can be "directly connecting" or "indirectly connecting through an intermediate medium", and specific meanings of the above terms can be understood according to specific situations for ordinary skilled in the art.

Embodiment 1

With reference to FIG. 1 to FIG. 11, a technical scheme of the present disclosure involves an automobile charger, which includes a microcontroller unit (MCU) 1, a switching power supply circuit 2, a first charging circuit 3, a second charging circuit 4, a battery voltage detection circuit 5, a charging current detection circuit 6, a constant-current driving control circuit 7, a constant-voltage driving control circuit 8 and a switch driving control circuit 9.

The MCU 1 is configured to control a switching power supply circuit to output different charging modes according to a state of a battery 13 to be charged.

The switching power supply circuit 2 is configured for converting an alternating current into a direct current.

The first charging circuit 3 is configured for providing constant-current or constant-voltage charging to the battery 13 to be charged. The first charging circuit 3 is connected between the switching power supply circuit 2 and the battery 13 to be charged, and an input of the first charging circuit 3 is connected with an output of the MCU 1.

The second charging circuit 4 is configured for providing pulse charging to the battery 13 to be charged, the second charging circuit 4 is connected between the switching power supply circuit 2 and the battery 13 to be charged, and an input of the second charging circuit 4 is connected with the output of the MCU 1.

The battery voltage detection circuit 5 is configured for detecting a real-time voltage signal of the battery 13 to be charged and feeding the real-time voltage signal back to the MCU 1.

The charging current detection circuit 6 is configured for detecting a real-time current signal of the battery 13 to be charged and feeding a real-time current signal back to the MCU 1.

The constant-current driving control circuit 7 receives the constant-current control signal of the MCU 1 and adjusts a constant-current charging output of the switching power supply circuit 2.

The constant-voltage driving control circuit 8 receives the constant-voltage control signal of the MCU 1 and adjusts a constant-voltage charging output of the switching power supply circuit 2.

The switch driving control circuit 9 receives the switch control signal of the MCU 1 to control on and off of the switching power supply circuit 2.

In this embodiment, it further includes a key circuit 10, a display circuit 11 and a overtemperature detection circuit 12.

The key circuit 10 is connected with an input of the MCU 1 and configured for adjusting or switching a type, a charging current and a charging voltage of the battery 13 to be charged.

The display circuit 11 receives a display control signal of the MCU 1 and displays a current charging state.

The overtemperature detection circuit 12 is configured for detecting a temperature signal of the battery 13 to be charged and feeding the temperature signal back to the MCU 1.

In the above embodiment, the key circuit can be sequentially switched by clicking a battery type switch key in an unloaded state, such as the lithium battery, the lead-acid battery, etc. The key circuit can be switched sequentially by clicking a voltage switch key in the unloaded state, for example, the charging voltage can be switched between 6V and 12V. The key circuit can be switched sequentially by clicking a current switch key in the unloaded state, for example, the charging current can be switched circularly between 2 A, 8 A and 15 A, but with the charging type of a lithium battery, the charging current may be fixed at 2 A.

In the above embodiments, the overtemperature detection circuit is configured to detect a temperature of the battery to be charged, and when the temperature is too high, the MCU is configured to control the switch driving control circuit to turn off output of the switching power supply, or the MCU is configured to control the first charging circuit and the second charging circuit to disconnect a connection loop between the output of the switching power supply and the battery to be charged.

In the above embodiment, the display circuit can be configured to display different charging modes, charging currents, charging voltages, charging types, fault alarms and other information.

Figure 2:
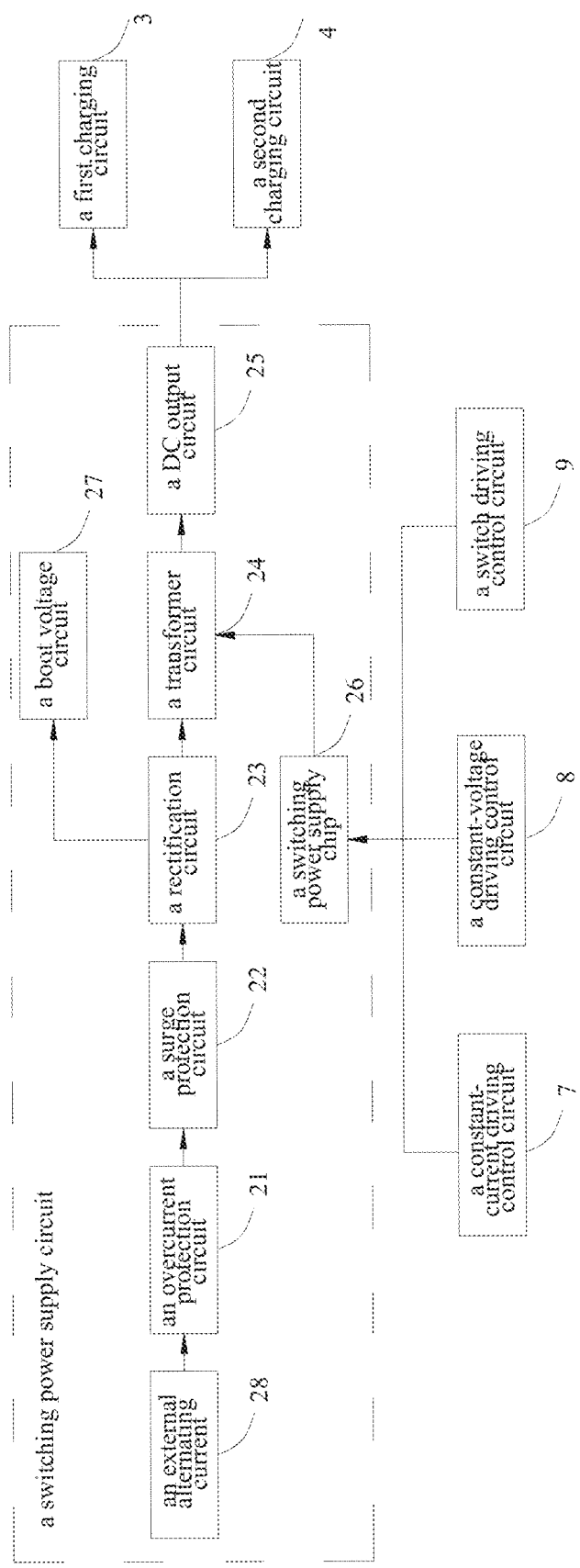
FIG. 2 is a circuit block diagram of a switching power supply circuit according to an embodiment of the present disclosure.
Figure 9:
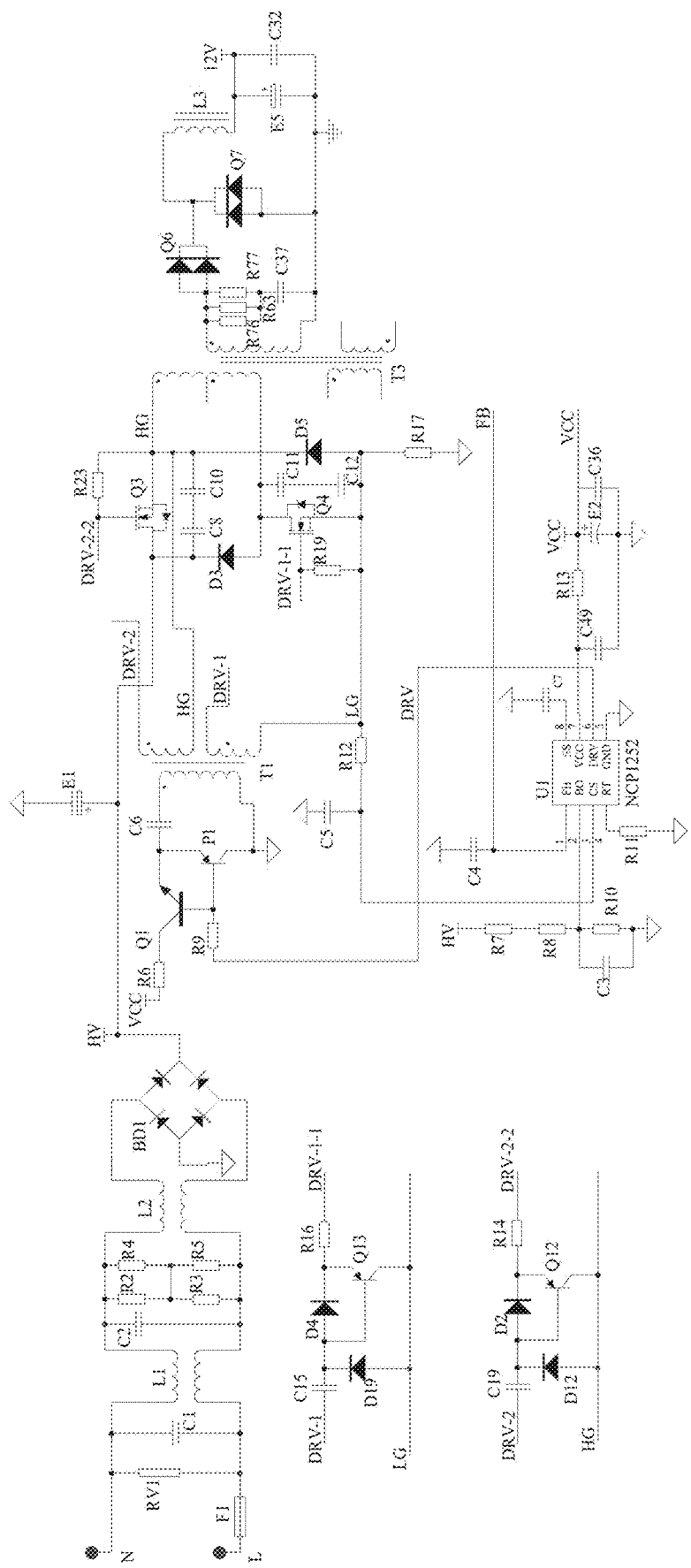
FIG. 9A and FIG. 9B are schematic diagrams of a switching power supply circuit according to an embodiment of the present disclosure.
Figure 10:
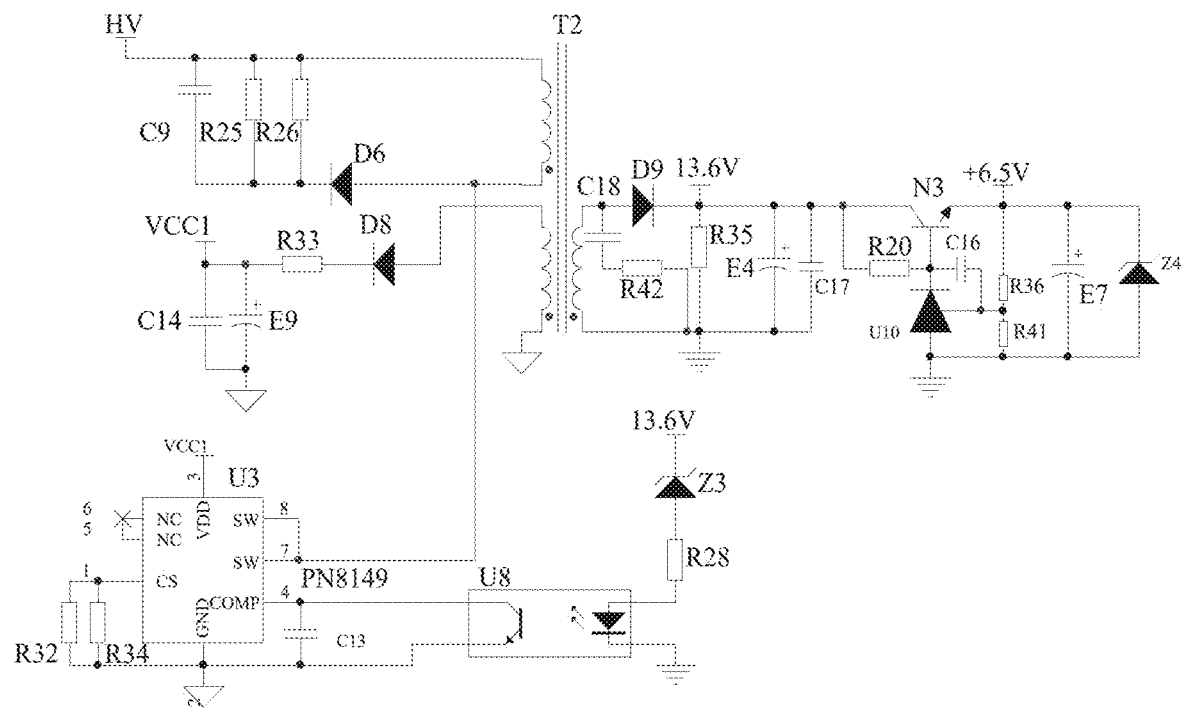
FIG. 10 is a schematic diagram of a step-down voltage circuit according to an embodiment of the present disclosure.

In this embodiment, referring FIGS. 2, 9 and 10, the switching power supply circuit 2 includes an overcurrent protection circuit 21, a surge protection circuit 22, a rectification circuit 23, a transformer circuit 24, a DC output circuit 25, a switching power supply chip 26 and a step-down voltage circuit 27. The overcurrent protection circuit 21 is connected with an external alternating current 28, the surge protection circuit 22 is connected between the overcurrent protection circuit 21 and the rectification circuit 23, and an output of the rectification circuit 23 is respectively connected with the transformer circuit 24 and the step-down voltage circuit; an output of the switching power supply chip 26 is connected with the transformer circuit 24, and an input of the switching power supply chip 26 are connected with the constant-current driving control circuit 7, the constant-voltage driving control circuit 8 and the switch driving control circuit 9 respectively. The transformer circuit 24 is connected with the DC output circuit 25, and the DC output circuit 25 is connected with the first charging circuit 3 and the second charging circuit 4 respectively.

In the above embodiment, the constant-current driving control circuit, the constant-voltage driving control circuit and the switch driving control circuit are connected with the switching power supply chip, respectively, and the switching power supply chip is configured to adjust the output and on and off of the switching power supply to realize a constant-current output and a constant-voltage output.

In the above embodiment, as shown in FIG. 9 (In order to show the details of the drawings more clearly, FIG. 9 is divided into FIG. 9A and FIG. 9B, and FIG. 9A and FIG. 9B are connected at corresponding places), the switching power supply chip is of a model NCP1252.

In the above embodiment, as shown in FIG. 10, the step-down voltage circuit 27 is configured to step down a rectified HV voltage to provide an independent operating voltage, and following high levels are provided by the step-down voltage circuit 27.

Figure 3:
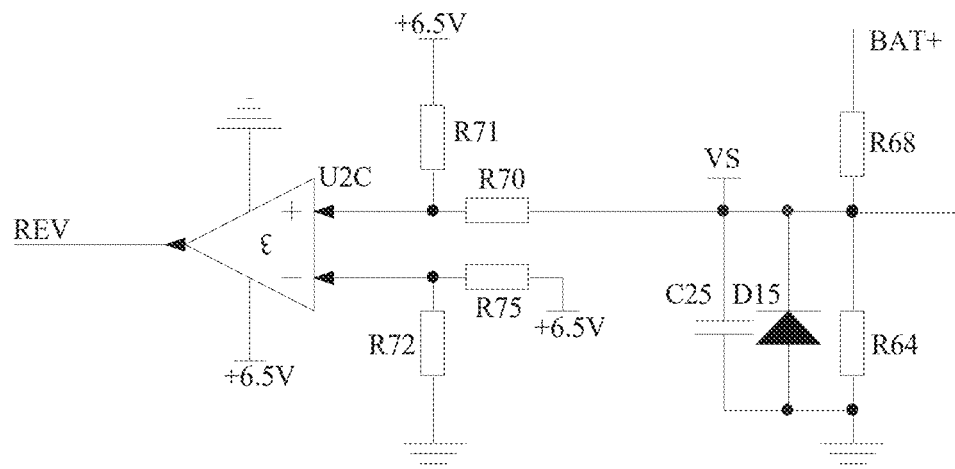
FIG. 3 is a schematic diagram of a battery voltage detection circuit according to an embodiment of the present disclosure.

In this embodiment, referring to FIG. 3, the battery voltage detection circuit includes a resistor R64, a resistor R68, a resistor R70, a resistor R71, a resistor R72, a resistor R75, a diode D15, a capacitor C25 and an operational amplifier U2C. The resistor R68 and the resistor R64 are connected in series, one end of the resistor R68 is connected to the battery to be charged, and one end of the resistor R64 is grounded. The capacitor C25 and the diode D15 are both connected in parallel across two ends of the resistor R64, one end of the resistor R70 is connected with the other end of the resistor R64, the other end of the resistor R70 is connected with one end of the resistor R71 and a non-inverting input of the operational amplifier U2C, and the other end of the resistor R71 is connected with a high level, one end of the resistor R75 and one end of the resistor R72 are respectively connected to an inverting input of the operational amplifier U2C, the other end of the resistor R75 is connected with a high level, the other end of the resistor R72 is grounded, an output of the operational amplifier U2C is reversely connected with the first charging circuit, and one end of the capacitor C25 is configured to output a voltage sampling signal VS to the input of the MCU.

In the above embodiment, the battery voltage detection circuit can be configured to not only detect a voltage signal of the battery to be charged during positive connection; but also to detect a reverse voltage signal of the battery to be charged, and when the MCU is configured to acquire the reverse voltage signal, a reverse connection fault can be displayed through the display circuit; and further to detect a short-circuited voltage signal of the battery to be charged, and when the MCU is configured to acquire the short-circuited voltage signal, the short-circuited fault also can be displayed through the display circuit, and electric energy is prohibited to be output to the battery to be charged.

Figure 4:
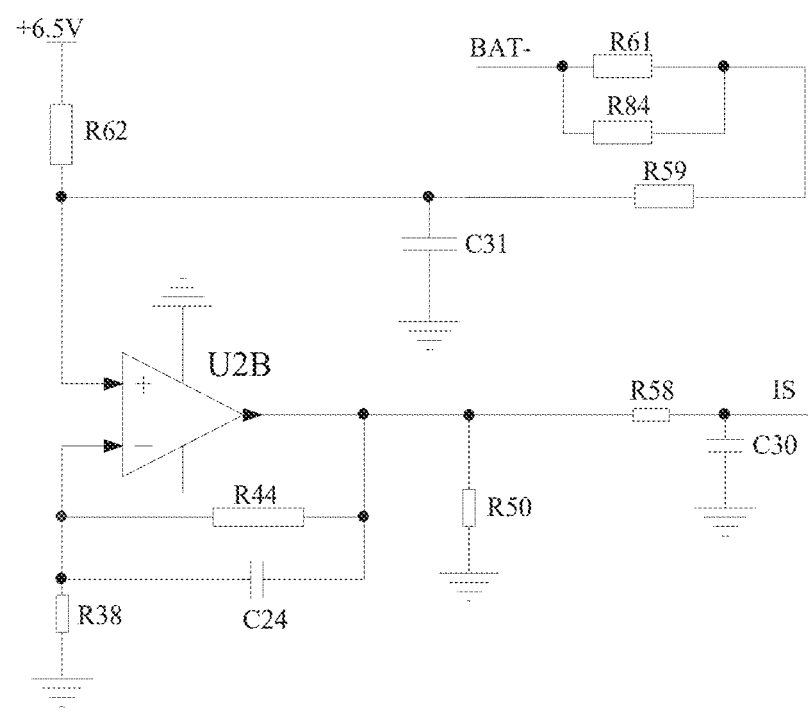
FIG. 4 is a schematic diagram of a charging current detection circuit according to an embodiment of the present disclosure.

In this embodiment, referring to FIG. 4, the charging current detection circuit includes a resistor R38, a resistor R44, a resistor R50, a resistor R58, a resistor R59, a resistor R61, a resistor R62, a resistor R84, a capacitor C24, a capacitor C30, a capacitor C31 and an operational amplifier U2B. The resistor R61 and the resistor R84 are connected in parallel, and one end of the resistor R61 is connected with the battery to be charged. The other end of resistor R61 is connected to one end of resistor R59, one end of resistor R59 is connected to one end of capacitor C31, one end of resistor R62 and a non-inverting input of operational amplifier U2B, the other end of capacitor C31 is grounded, the other end of resistor R62 is connected to a high level, one end of resistor R44 is connected to the inverting input of operational amplifier U2B and one end of resistor R38, the other end of the resistor R38 is grounded, the other end of the resistor R44 is connected with an output of the operational amplifier U2B, one end of the resistor R50 and one end of the resistor R58, the other end of the resistor R50 is grounded, the capacitor C24 is connected in parallel across two ends of the resistor R44, the other end of the resistor R58 is connected with one end of the capacitor C30, the other end of the capacitor C30 is grounded, and the other end of the resistor R58 is configured to output a current sampling signal IS to the input of the MCU.

In the above embodiment, the resistor R61 and the resistor R84 are constantan wires, and are connected in parallel in a charging circuit to detect the charging current.

Figure 5:
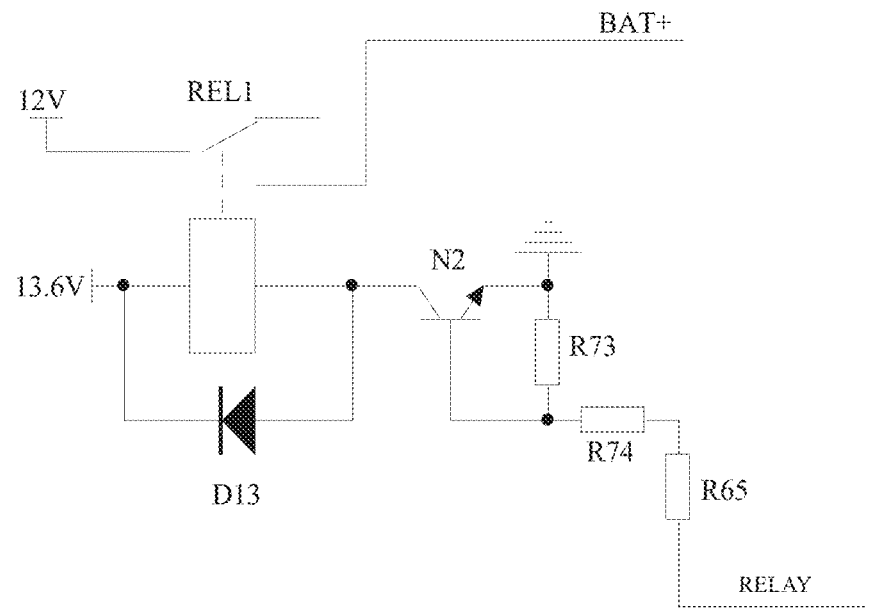
FIG. 5 is a schematic diagram of a first charging circuit according to an embodiment of the present disclosure.
Figure 6:
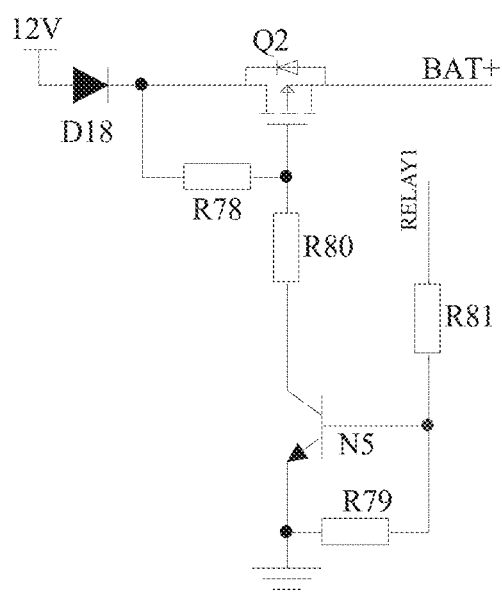
FIG. 6 is a schematic diagram of a second charging circuit according to an embodiment of the present disclosure.

In the above embodiment, the constant-current control signal and the constant-voltage control signal are both pulse signals. Referring to FIG. 5, the first charging circuit is a charging circuit with an open or closed contactor, and the MCU is configured to output a RELAY signal to the input of the first charging circuit, and to control a transistor N2 to turn on, so that the contactor REL1 is turned on and thus a loop between the output of the switching power supply circuit and the battery to be charged is kept on, so as to realize the constant-voltage charging or the constant-current charging. Referring to FIG. 6, the second charging circuit is a charging circuit with a turned-on/off power transistor, and the MCU is configured to output a RELAY pulse signal to the input of the second charging circuit, and to control a transistor N5 to be turned on and off continuously, so that a MOS transistor Q2 is turned on and off continuously and the loop between the output of the switching power supply circuit and the battery to be charged is caused to be turned on and off continuously, thus realizing pulse charging.

Figure 7:
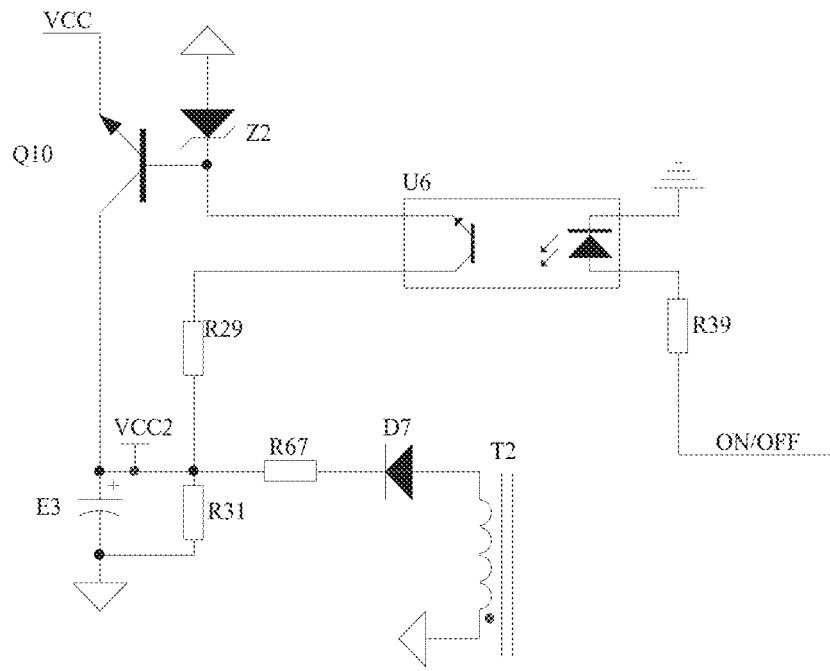
FIG. 7 is a schematic diagram of a switch driving control circuit according to an embodiment of the present disclosure.

In the above embodiment, as shown in FIG. 7, the MCU is configured to output a switching signal ON/OFF to the switching driving control circuit, and the output of the switching driving control circuit is connected to a VCC pin of the switching power supply chip, thereby realizing output or disconnection of the switching power supply.

Figure 8:
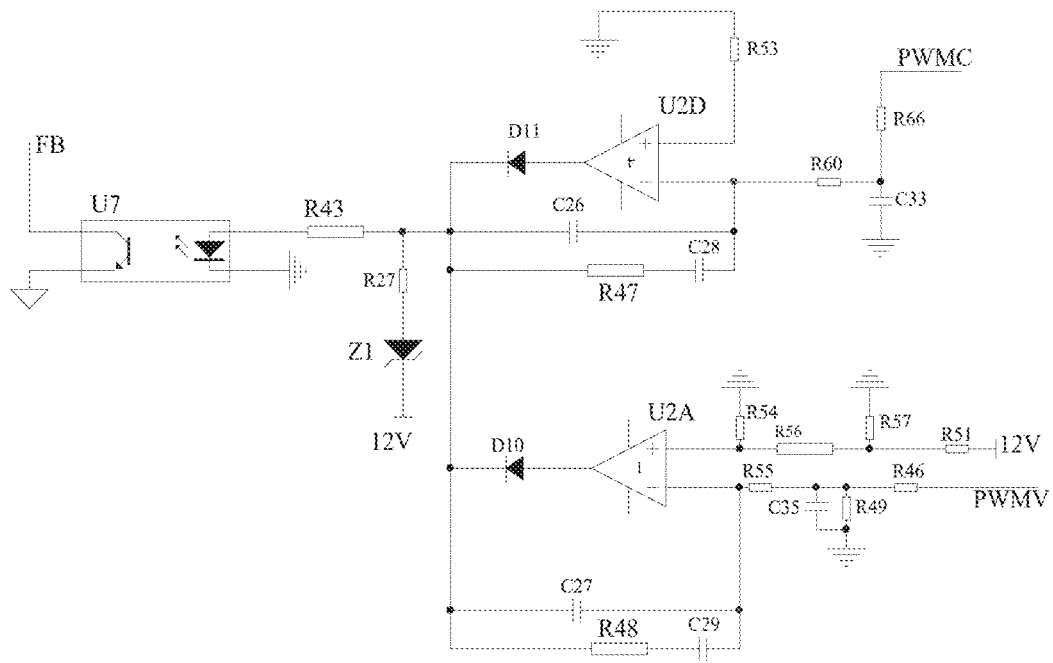
FIG. 8 is a schematic diagram of a constant-current driving control circuit and a constant-voltage driving control circuit according to an embodiment of the present disclosure.

In the above embodiment, as shown in FIG. 8, the MCU is configured to output the constant-current control signals PWMC with different duty ratios to the constant-voltage driving control circuit and the constant-voltage control signals PWMV with different duty ratios to the constant-voltage driving control circuit, and the collector of the optocoupler U7 is connected to a FB pin of the switching power supply chip, thereby realizing outputs of different charging modes of the switching power supply. The constant-current control signal and constant-voltage control signal described in Embodiment 2 are pulse signals with different duty ratios.

Figure 11:
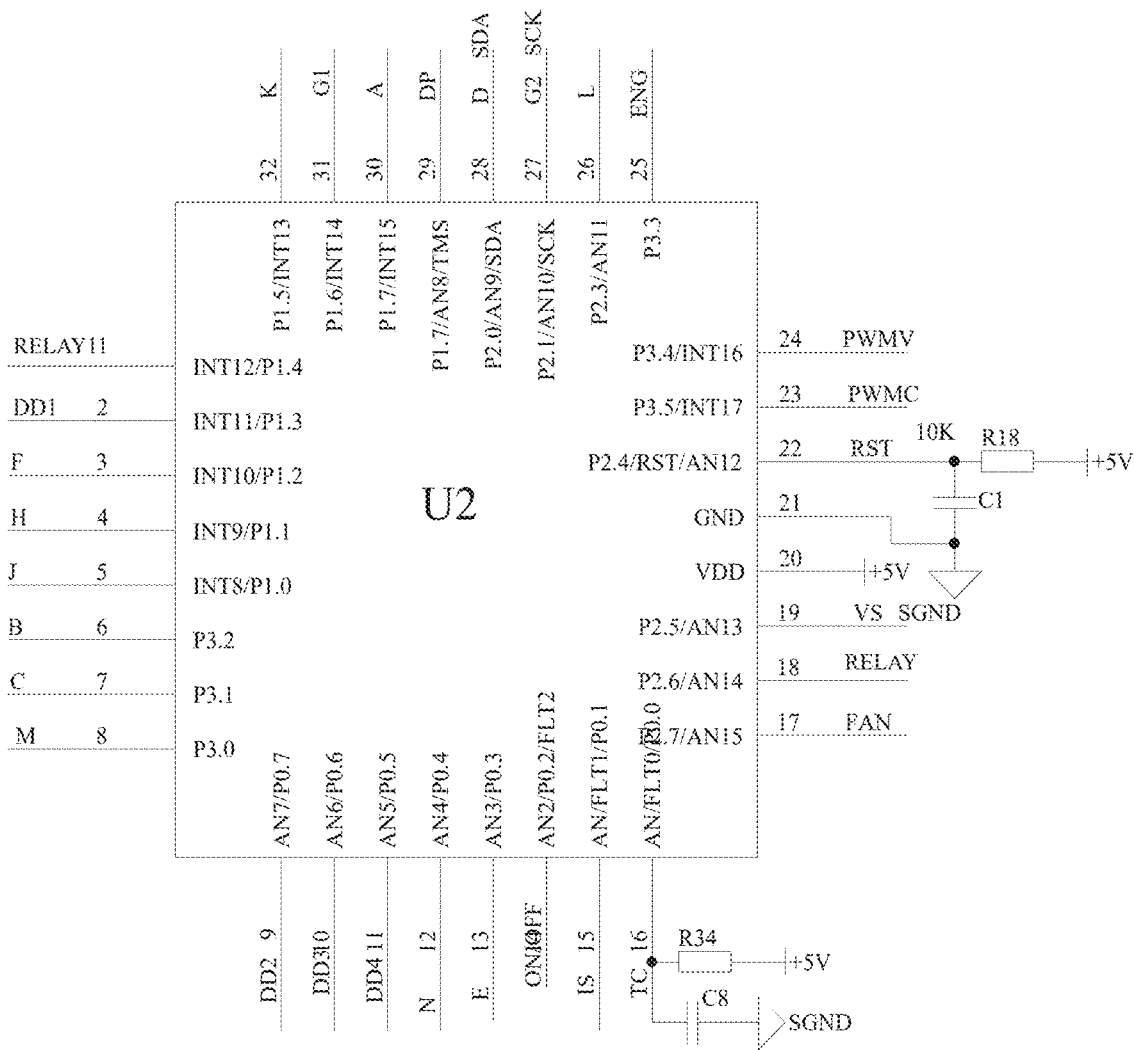
FIG. 11 is a schematic diagram of an MCU circuit according to an embodiment of the present disclosure.

In this embodiment, as shown in FIG. 11, a model of the MCU is not limited, as long as a number of I/O pins meets requirements of respective circuits in this embodiment.

The automobile charger according to this embodiment is provided with the first charging circuit and the second charging circuit, which can realize three charging modes on the battery, namely, the constant current charging, the constant voltage charging and the pulse charging. In a charging process, the real-time voltage signal and the real-time current signal are collected with the battery voltage detection circuit and the charging current detection circuit, and through feedback of the real-time voltage signal and the real-time current signal, the MCU is configured to output PWM signals with different duty ratios to the constant-current driving control circuit and the constant-voltage driving control circuit, so as to realize output of different voltage values and current values of the switching power supply, thereby performing different charging modes on the battery to be charged and improving charging efficiency and safety of the battery.

Embodiment 2

A technical scheme of the disclosure involves a charging method using the automobile charger described in Embodiment 1, which includes following steps.

The automobile charger is connected between an external AC power supply and a battery to be charged, a battery type, a charging voltage and a charging current is set according to the battery to be charged so as to start charging.

A real-time voltage signal and a real-time current signal of the battery to be charged is collected, and the switching power supply circuit is controlled to perform different charging modes according to the real-time voltage signal and the real-time current signal of the battery to be charged. The charging modes include at least two of pulse charging, constant current charging, 0.5 times constant current charging, constant voltage charging, repair charging and float charging.

In this embodiment, the real-time voltage signal and the real-time current signal of the battery to be charged are collected when the battery type of the battery to be charged is a lead-acid battery.

If the real-time voltage signal is less than a first voltage threshold, the second charging circuit is controlled to operate, and a first constant-current control signal is output to the constant-current driving control circuit and a first constant-voltage control signal is output to the constant-voltage driving control circuit at the same time, and the second charging circuit is configured to output a pulse signal to perform pulse charging on the battery to be charged.

If the real-time voltage signal is larger than the first voltage threshold and smaller than a second voltage threshold, the first charging circuit is controlled to operate, and a second constant-current control signal is output to the constant-current driving control circuit and a second constant-voltage control signal is output to the constant-voltage driving control circuit, so that the first charging circuit performs 0.5 times constant current charging on the battery to be charged.

If the real-time voltage signal is larger than the second voltage threshold and smaller than a third voltage threshold, the first charging circuit is controlled to operate, and a third constant-current control signal is output to the constant-current driving control circuit and a third constant-voltage control signal is output to the constant-voltage driving control circuit, so that the first charging circuit performs constant current charging on the battery to be charged.

If the real-time voltage signal is greater than the third voltage threshold, the first charging circuit is controlled to operate, and a fourth constant-current control signal is output to the constant-current driving control circuit and the fourth constant-voltage control signal is output to the constant-voltage driving control circuit, so that the first charging circuit performs constant voltage charging on the battery to be charged until the real-time current signal is less than the first current threshold, so as to complete the constant-voltage charging.

After the constant voltage charging is completed, the first charging circuit and the second charging circuit are disconnected to allow the charged battery to stand for a fixed time t, and then the real-time voltage signal is re-acquired, and a voltage drop value of the battery after standing for the fixed time t is calculated. If the voltage drop value exceeds a preset voltage drop value, the battery is determined to be damaged; then the first charging circuit is controlled to operate, and a fifth constant-current control signal is output to the constant-voltage driving control circuit and a fifth constant-voltage control signal is output to the constant-voltage driving control circuit at the same time, so that an output voltage of the switching power supply circuit is increased and repair charging is performed on the battery. If the voltage drop value does not exceed the voltage drop preset value, it is determined that the battery is normal, and float charging is performed on the battery until battery charging is completed.

In the above embodiment, in order to better understand the charging method, segmented charging of a lead-acid battery with a charging level of 12V is further illustrated, in which the MCU is configured to collect the real-time voltage signal and the real-time current signal.

If a voltage of the lead-acid battery is lower than 8V, the pulse charging is made.

If the voltage of the lead-acid battery is higher than 8V and lower than 10V, the 0.5 times constant current charging is made.

If the voltage of the lead-acid battery is higher than 10V and lower than 14.2V, the constant current charging is made.

If the voltage of the lead-acid battery is higher than 14.2V, the constant-voltage charging is made until the real-time current signal is less than the first current threshold, so as to complete the constant-voltage charging.

After the constant-voltage charging, the charging circuit of the lead-acid battery is disconnected and stands for a fixed time t, the voltage drop value of the battery after standing for the fixed time t is calculated and compared with a preset value to determine whether the lead-acid battery is normal or damaged, and if it is damaged, the output voltage of the switching power supply circuit is increased to repair and charge the battery; and if it is normal, the float charging is made to the battery until the battery charging is complete.

In this embodiment, the real-time voltage signal and the real-time current signal of the battery to be charged are collected when the battery type of the battery to be charged is a lithium battery.

If the real-time voltage signal is less than a fourth voltage threshold, the first charging circuit is controlled to operate, and a sixth constant-current control signal is output to the constant-current driving control circuit and a sixth constant-voltage control signal is output to the constant-voltage driving control circuit at the same time, so that the first charging circuit performs constant current charging on the battery to be charged.

If the real-time voltage signal is greater than the forth voltage threshold, the first charging circuit is controlled to operate, and a seventh constant-current control signal is output to the constant-current driving control circuit and the seventh constant-voltage control signal is output to the constant-voltage driving control circuit, so that the first charging circuit performs constant voltage charging on the battery to be charged until the real-time current signal is less than the second current threshold, so as to complete the battery charging.

Embodiment 3

A computer storage medium is provided, on which computer program instructions are stored. The computer program instructions, when executed by a processor, implement the charging method described in Embodiment 2.

The present disclosure and embodiments thereof are described above in an illustrative manner, which is not restrictive; and what is shown in the drawings is only one of the embodiments of the present disclosure, and its actual structure is not limited thereto. Therefore, structures and embodiments similar to the technical scheme designed by those of ordinary skilled in the art inspired by this disclosure without creativity, without departing from the creative purpose of the present disclosure, are all within a protection scope of the present disclosure.

What is claimed is:

1. An automobile charger, comprising:
a MCU configured to control a switching power supply circuit to output different charging modes according to a state of a battery to be charged;
a switching power supply circuit configured for converting an alternating current into a direct current;
a first charging circuit configured for providing constant-current or constant-voltage charging to the battery to be charged, the first charging circuit being connected between the switching power supply circuit and the battery to be charged, and an input of the first charging circuit being connected with an output of the MCU;
a second charging circuit configured for providing pulse charging to the battery to be charged, the second charging circuit being connected between the switching power supply circuit and the battery to be charged, and an input of the second charging circuit being connected with the output of the MCU;
a battery voltage detection circuit configured for detecting a real-time voltage signal of the battery to be charged and feeding the real-time voltage signal back to the MCU;
a charging current detection circuit configured for detecting a real-time current signal of the battery to be charged and feeding a real-time current signal back to the MCU;
a constant-current driving control circuit receiving the constant-current control signal of the MCU and adjusting a constant-current charging output of the switching power supply circuit;
a constant-voltage driving control circuit receiving the constant-voltage control signal of the MCU and adjusting a constant-voltage charging output of the switching power supply circuit; and
a switch driving control circuit receiving the switch control signal of the MCU to control on and off of the switching power supply circuit;
wherein the battery voltage detection circuit comprises a resistor R64, a resistor R68, a resistor R70, a resistor R71, a resistor R72, a resistor R75, a diode D15, a capacitor C25 and an operational amplifier U2C, wherein the resistor R68 and the resistor R64 are connected in series, one end of the resistor R68 is connected to the battery to be charged, and one end of the resistor R64 is grounded; the capacitor C25 and the diode D15 are both connected in parallel across two ends of the resistor R64, one end of the resistor R70 is connected with the other end of the resistor R64, the other end of the resistor R70 is connected with one end of the resistor R71 and a non-inverting input of the operational amplifier U2C, and the other end of the resistor R71 is connected with a high voltage level, one end of the resistor R75 and one end of the resistor R72 are respectively connected to an inverting input of the operational amplifier U2C, the other end of the resistor R75 is connected with a high voltage level, the other end of the resistor R72 is grounded, an output of the operational amplifier U2C is reversely connected with the first charging circuit, and one end of the capacitor C25 is configured to output a voltage sampling signal VS to the input of the MCU.

2. The automobile charger according to claim 1, further comprising:
a key circuit connected with an input of the MCU and configured for adjusting or switching a type, a charging current and a charging voltage of the battery to be charged;
a display circuit receiving a display control signal of the MCU and displaying a current charging state; and
an overtemperature detection circuit configured for detecting a temperature signal of the battery to be charged and feeding the temperature signal back to the MCU.

3. The automobile charger according to claim 1, wherein the switching power supply circuit comprises an overcurrent protection circuit, a surge protection circuit, a rectification circuit, a transformer circuit, a DC output circuit, a switching power supply chip and a step-down voltage circuit, wherein the overcurrent protection circuit is connected with an external alternating current, the surge protection circuit is connected between the overcurrent protection circuit and the rectification circuit, and an output of the rectification circuit is respectively connected with the transformer circuit and the step-down voltage circuit; an output of the switching power supply chip is connected with the transformer circuit, and an input of the switching power supply chip are connected with the constant-current driving control circuit, the constant-voltage driving control circuit and the switch driving control circuit respectively, the transformer circuit is connected with the DC output circuit, and the DC output circuit is connected with the first charging circuit and the second charging circuit respectively.

4. The automobile charger according to claim 3, wherein the charging current detection circuit comprises a resistor R38, a resistor R44, a resistor R50, a resistor R58, a resistor R59, a resistor R61, a resistor R62, a resistor R84, a capacitor C24, a capacitor C30, a capacitor C31 and an operational amplifier U2B, wherein the resistor R61 and the resistor R84 are connected in parallel, and one end of the resistor R61 is connected with the battery to be charged; the other end of resistor R61 is connected to one end of resistor R59, one end of resistor R59 is connected to one end of capacitor C31, one end of resistor R62 and a non-inverting input of operational amplifier U2B, the other end of capacitor C31 is grounded, the other end of resistor R62 is connected to a high voltage level, one end of resistor R44 is connected to the inverting input of operational amplifier U2B and one end of resistor R38, the other end of the resistor R38 is grounded, the other end of the resistor R44 is respectively connected with an output of the operational amplifier U2B, one end of the resistor R50 and one end of the resistor R58, the other end of the resistor R50 is grounded, the capacitor C24 is connected in parallel across two ends of the resistor R44, the other end of the resistor R58 is connected with one end of the capacitor C30, the other end of the capacitor C30 is grounded, and the other end of the resistor R58 is configured to output a current sampling signal IS to the input of the MCU.

5. The automobile charger according to claim 3, wherein the constant-current control signal and the constant-voltage control signal are both pulse signals, and the first charging circuit is a charging circuit with an open or closed contactor; and the second charging circuit is a charging circuit with a turned-on/off power transistor.

6. The automobile charger according to claim 1, wherein the charging current detection circuit comprises a resistor R38, a resistor R44, a resistor R50, a resistor R58, a resistor R59, a resistor R61, a resistor R62, a resistor R84, a capacitor C24, a capacitor C30, a capacitor C31 and an operational amplifier U2B, wherein the resistor R61 and the resistor R84 are connected in parallel, and one end of the resistor R61 is connected with the battery to be charged; the other end of resistor R61 is connected to one end of resistor R59, one end of resistor R59 is connected to one end of capacitor C31, one end of resistor R62 and a non-inverting input of operational amplifier U2B, the other end of capacitor C31 is grounded, the other end of resistor R62 is connected to a high voltage level, one end of resistor R44 is connected to the inverting input of operational amplifier U2B and one end of resistor R38, the other end of the resistor R38 is grounded, the other end of the resistor R44 is respectively connected with an output of the operational amplifier U2B, one end of the resistor R50 and one end of the resistor R58, the other end of the resistor R50 is grounded, the capacitor C24 is connected in parallel across two ends of the resistor R44, the other end of the resistor R58 is connected with one end of the capacitor C30, the other end of the capacitor C30 is grounded, and the other end of the resistor R58 is configured to output a current sampling signal IS to the input of the MCU.

7. The automobile charger according to claim 1, wherein the constant-current control signal and the constant-voltage control signal are both pulse signals, and the first charging circuit is a charging circuit with an open or closed contactor; and the second charging circuit is a charging circuit with a turned-on/off power transistor.

8. A charging method using the automobile charger according to claim 1, comprising:
   connecting the automobile charger between an external AC power supply and a battery to be charged, and setting a battery type, a charging voltage and a charging current according to the battery to be charged so as to start charging; and
   collecting a real-time voltage signal and a real-time current signal of the battery to be charged, and controlling the switching power supply circuit to perform different charging modes according to the real-time voltage signal and the real-time current signal of the battery to be charged, the charging modes comprising at least two of pulse charging, constant current charging, 0.5 times constant current charging, constant voltage charging, repair charging and float charging; wherein the real-time voltage signal and the real-time current signal of the battery to be charged are collected when the battery type of the battery to be charged is a lithium battery;
   if the real-time voltage signal is less than a fourth voltage threshold, the first charging circuit is controlled to operate, and a sixth constant-current control signal is output to the constant-current driving control circuit and a sixth constant-voltage control signal is output to the constant-voltage driving control circuit at the same time, so that the first charging circuit performs constant current charging on the battery to be charged; and
   if the real-time voltage signal is greater than the forth voltage threshold, the first charging circuit is controlled to operate, and a seventh constant-current control signal is output to the constant-current driving control circuit and the seventh constant-voltage control signal is output to the constant-voltage driving control circuit, so that the first charging circuit performs constant voltage charging on the battery to be charged until the real-time current signal is less than the second current threshold, so as to complete the battery charging.

9. The charging method according to claim 8, wherein the real-time voltage signal and the real-time current signal of the battery to be charged are collected when the battery type of the battery to be charged is a lead-acid battery:
   if the real-time voltage signal is less than a first voltage threshold, the second charging circuit is controlled to operate, and a first constant-current control signal is output to the constant-current driving control circuit and a first constant-voltage control signal is output to the constant-voltage driving control circuit at the same time, and the second charging circuit is configured to output a pulse signal to perform pulse charging on the battery to be charged;
   if the real-time voltage signal is larger than the first voltage threshold and smaller than a second voltage threshold, the first charging circuit is controlled to operate, and a second constant-current control signal is output to the constant-current driving control circuit and a second constant-voltage control signal is output to the constant-voltage driving control circuit, so that the first charging circuit performs 0.5 times constant current charging on the battery to be charged;

if the real-time voltage signal is larger than the second voltage threshold and smaller than a third voltage threshold, the first charging circuit is controlled to operate, and a third constant-current control signal is output to the constant-current driving control circuit and a third constant-voltage control signal is output to the constant-voltage driving control circuit, so that the first charging circuit performs constant current charging on the battery to be charged;

if the real-time voltage signal is greater than the third voltage threshold, the first charging circuit is controlled to operate, and a fourth constant-current control signal is output to the constant-current driving control circuit and the fourth constant-voltage control signal is output to the constant-voltage driving control circuit, so that the first charging circuit performs constant voltage charging on the battery to be charged until the real-time current signal is less than the first current threshold, so as to complete the constant-voltage charging; and after the constant voltage charging is completed, the first charging circuit and the second charging circuit are disconnected to allow the charged battery to stand for a fixed time t, and then the real-time voltage signal is re-acquired, and a voltage drop value of the battery after standing for the fixed time t is calculated; and if the voltage drop value exceeds a preset voltage drop value, the battery is determined to be damaged, then the first charging circuit is controlled to operate, and a fifth constant-current control signal is output to the constant-voltage driving control circuit and a fifth constant-voltage control signal is output to the constant-voltage driving control circuit at the same time, so that an output voltage of the switching power supply circuit is increased and repair charging is performed on the battery; and if the voltage drop value does not exceed the voltage drop preset value, it is determined that the battery is normal, and float charging is performed on the battery until battery charging is completed.

10. A computer storage medium, comprising computer program instructions stored thereon, the computer program instructions, when executed by a processor, implementing the charging method according to claim 8.

11. The charging method according to claim 8, wherein the automobile charger further comprises:
 a key circuit connected with an input of the MCU and configured for adjusting or switching a type, a charging current and a charging voltage of the battery to be charged;
 a display circuit receiving a display control signal of the MCU and displaying a current charging state; and
 an overtemperature detection circuit configured for detecting a temperature signal of the battery to be charged and feeding the temperature signal back to the MCU.

12. The charging method according to claim 8, wherein the switching power supply circuit comprises an overcurrent protection circuit, a surge protection circuit, a rectification circuit, a transformer circuit, a DC output circuit, a switching power supply chip and a step-down voltage circuit, wherein the overcurrent protection circuit is connected with an external alternating current, the surge protection circuit is connected between the overcurrent protection circuit and the rectification circuit, and an output of the rectification circuit is respectively connected with the transformer circuit and the step-down voltage circuit; an output of the switching power supply chip is connected with the transformer circuit, and an input of the switching power supply chip are connected with the constant-current driving control circuit, the constant-voltage driving control circuit and the switch driving control circuit respectively, the transformer circuit is connected with the DC output circuit, and the DC output circuit is connected with the first charging circuit and the second charging circuit respectively.

13. The charging method according to claim 8, wherein the constant-current control signal and the constant-voltage control signal are both pulse signals, and the first charging circuit is a charging circuit with an open or closed contactor; and the second charging circuit is a charging circuit with a turned-on/off power transistor.

14. The charging method according to claim 13, wherein the real-time voltage signal and the real-time current signal of the battery to be charged are collected when the battery type of the battery to be charged is a lead-acid battery:
 if the real-time voltage signal is less than a first voltage threshold, the second charging circuit is controlled to operate, and a first constant-current control signal is output to the constant-current driving control circuit and a first constant-voltage control signal is output to the constant-voltage driving control circuit at the same time, and the second charging circuit is configured to output a pulse signal to perform pulse charging on the battery to be charged;
 if the real-time voltage signal is larger than the first voltage threshold and smaller than a second voltage threshold, the first charging circuit is controlled to operate, and a second constant-current control signal is output to the constant-current driving control circuit and a second constant-voltage control signal is output to the constant-voltage driving control circuit, so that the first charging circuit performs 0.5 times constant current charging on the battery to be charged;
 if the real-time voltage signal is larger than the second voltage threshold and smaller than a third voltage threshold, the first charging circuit is controlled to operate, and a third constant-current control signal is output to the constant-current driving control circuit and a third constant-voltage control signal is output to the constant-voltage driving control circuit, so that the first charging circuit performs constant current charging on the battery to be charged;
 if the real-time voltage signal is greater than the third voltage threshold, the first charging circuit is controlled to operate, and a fourth constant-current control signal is output to the constant-current driving control circuit and the fourth constant-voltage control signal is output to the constant-voltage driving control circuit, so that the first charging circuit performs constant voltage charging on the battery to be charged until the real-time current signal is less than the first current threshold, so as to complete the constant-voltage charging; and
 after the constant voltage charging is completed, the first charging circuit and the second charging circuit are disconnected to allow the charged battery to stand for a fixed time t, and then the real-time voltage signal is re-acquired, and a voltage drop value of the battery after standing for the fixed time t is calculated; and if the voltage drop value exceeds a preset voltage drop value, the battery is determined to be damaged, then the first charging circuit is controlled to operate, and a fifth constant-current control signal is output to the constant-voltage driving control circuit and a fifth constant-voltage control signal is output to the constant-voltage driving control circuit at the same time, so that an output voltage of the switching power supply circuit is increased and repair charging is performed on the battery; and if the voltage drop value does not exceed the voltage drop preset value, it is determined that the battery is normal, and float charging is performed on the battery until battery charging is completed.

15. The charging method according to claim 13, wherein the real-time voltage signal and the real-time current signal of the battery to be charged are collected when the battery type of the battery to be charged is a lithium battery:

if the real-time voltage signal is less than a fourth voltage threshold, the first charging circuit is controlled to operate, and a sixth constant-current control signal is output to the constant-current driving control circuit and a sixth constant-voltage control signal is output to the constant-voltage driving control circuit at the same time, so that the first charging circuit performs constant current charging on the battery to be charged; and if the real-time voltage signal is greater than the forth voltage threshold, the first charging circuit is controlled to operate, and a seventh constant-current control signal is output to the constant-current driving control circuit and the seventh constant-voltage control signal is output to the constant-voltage driving control circuit, so that the first charging circuit performs constant voltage charging on the battery to be charged until the real-time current signal is less than the second current threshold, so as to complete the battery charging.

16. An automobile charger, comprising:

a MCU configured to control a switching power supply circuit to output different charging modes according to a state of a battery to be charged;

a switching power supply circuit configured for converting an alternating current into a direct current;

a first charging circuit configured for providing constant-current or constant-voltage charging to the battery to be charged, the first charging circuit being connected between the switching power supply circuit and the battery to be charged, and an input of the first charging circuit being connected with an output of the MCU;

a second charging circuit configured for providing pulse charging to the battery to be charged, the second charging circuit being connected between the switching power supply circuit and the battery to be charged, and an input of the second charging circuit being connected with the output of the MCU;

a battery voltage detection circuit configured for detecting a real-time voltage signal of the battery to be charged and feeding the real-time voltage signal back to the MCU;

a charging current detection circuit configured for detecting a real-time current signal of the battery to be charged and feeding a real-time current signal back to the MCU;

a constant-current driving control circuit receiving the constant-current control signal of the MCU and adjusting a constant-current charging output of the switching power supply circuit;

a constant-voltage driving control circuit receiving the constant-voltage control signal of the MCU and adjusting a constant-voltage charging output of the switching power supply circuit; and a switch driving control circuit receiving the switch control signal of the MCU to control on and off of the switching power supply circuit;

wherein the charging current detection circuit comprises a resistor R38, a resistor R44, a resistor R50, a resistor R58, a resistor R59, a resistor R61, a resistor R62, a resistor R84, a capacitor C24, a capacitor C30, a capacitor C31 and an operational amplifier U2B, wherein the resistor R61 and the resistor R84 are connected in parallel, and one end of the resistor R61 is connected with the battery to be charged; the other end of resistor R61 is connected to one end of resistor R59, one end of resistor R59 is connected to one end of capacitor C31, one end of resistor R62 and a non-inverting input of operational amplifier U2B, the other end of capacitor C31 is grounded, the other end of resistor R62 is connected to a high voltage level, one end of resistor R44 is connected to the inverting input of operational amplifier U2B and one end of resistor R38, the other end of the resistor R38 is grounded, the other end of the resistor R44 is respectively connected with an output of the operational amplifier U2B, one end of the resistor R50 and one end of the resistor R58, the other end of the resistor R50 is grounded, the capacitor C24 is connected in parallel across two ends of the resistor R44, the other end of the resistor R58 is connected with one end of the capacitor C30, the other end of the capacitor C30 is grounded, and the other end of the resistor R58 is configured to output a current sampling signal IS to the input of the MCU.

* * * * *